United States Patent
Lettich et al.

(10) Patent No.: US 12,500,466 B2
(45) Date of Patent: Dec. 16, 2025

(54) STATOR WITH BAR WINDING AND FLUID COOLING FOR A ROTARY ELECTRIC MACHINE

(71) Applicant: MARELLI EUROPE S.P.A., Corbetta (IT)

(72) Inventors: Marzio Lettich, Corbetta (IT); Giacomo David, Corbetta (IT); Enzo Antonio Bellini, Corbetta (IT); Daniele Zecchetti, Corbetta (IT); Vincenzo Giorgianni, Corbetta (IT); Gianluca Cesari, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 289 days.

(21) Appl. No.: 18/350,158

(22) Filed: Jul. 11, 2023

(65) Prior Publication Data
US 2024/0022130 A1 Jan. 18, 2024

(30) Foreign Application Priority Data
Jul. 12, 2022 (IT) .................. 102022000014590

(51) Int. Cl.
*H02K 3/24* (2006.01)
*H02K 3/34* (2006.01)
(Continued)

(52) U.S. Cl.
CPC .............. *H02K 3/24* (2013.01); *H02K 3/345* (2013.01); *H02K 9/19* (2013.01); *H02K 15/12* (2013.01)

(58) Field of Classification Search
CPC .......... H02K 15/10; H02K 15/12; H02K 3/24; H02K 3/345; H02K 9/19; H02K 9/197
See application file for complete search history.

(56) References Cited

U.S. PATENT DOCUMENTS 10,910,897 B2 2/2021 Mashkin et al.
12,132,368 B2 * 10/2024 Engelhardt .............. H02K 3/28
(Continued)

FOREIGN PATENT DOCUMENTS

DE 102018006274 A1 12/2019
EP 2437378 A1 4/2012

OTHER PUBLICATIONS

Communication mailed Dec. 19, 2023 enclosing the Extended European Search Report dated Dec. 11, 2023 for European Patent Application No. 23184383.
(Continued)

*Primary Examiner* — Christopher M Koehler
*Assistant Examiner* — Ethan Nguyen Vo
(74) *Attorney, Agent, or Firm* — Howard & Howard Attorneys PLLC

(57) ABSTRACT

Stator for a rotary electric machine and having: a magnetic core axially crossed by a plurality of slots; a stator winding comprising a plurality of bars which are arranged inside the slots; a plurality of cooling channels which, in use, are flown through by a cooling fluid and are obtained inside the slots between the bars of the stator winding; and a plurality of covering elements, each of which consists of an electrically insulating plastic material, engages, without clearance, a corresponding slot on all sides of the slot, and centrally has a cavity wherein a series of corresponding bars are arranged and wherein the cooling channels are obtained.

12 Claims, 7 Drawing Sheets

(51) Int. Cl.
  *H02K 9/19* (2006.01)
  *H02K 15/12* (2025.01)

(56) References Cited

U.S. PATENT DOCUMENTS

| | | |
|---|---|---|
| 2019/0245399 A1 | 8/2019 | Mashkin et al. |
| 2020/0153306 A1 | 5/2020 | Uhlmann |
| 2020/0156296 A1 | 5/2020 | E Silva et al. |
| 2020/0169136 A1 | 5/2020 | Sercombe et al. |
| 2020/0373800 A1 | 11/2020 | Stoll et al. |
| 2021/0328472 A1 | 10/2021 | Diehl et al. |

OTHER PUBLICATIONS

Search Report for Italian Patent Application No. 202200014590 dated Feb. 16, 2023.

\* cited by examiner

STATOR WITH BAR WINDING AND FLUID COOLING FOR A ROTARY ELECTRIC MACHINE

CROSS-REFERENCE TO RELATED PATENT APPLICATIONS

This patent application claims priority from the Italian Patent Application no. 102022000014590 filed on 12 Jul. 2022, the entire contents of which is incorporated herein by reference.

FIELD OF THE ART

The present invention relates to a stator with bar winding and fluid cooling for a rotary electric machine.

PRIOR ART

Patent Application EP2437378A1 discloses a stator of a rotary electric machine provided with a rigid bar winding (so-called "hairpins"). In winding a stator by means of rigid bars, a series of rigid bars are used, which are initially shaped into a "U" and are then axially inserted into the stator slots, forming an inlet side, wherein the cusps of the U-shaped rigid bars are arranged, and an outlet side, wherein the end portions of the legs (i.e. the straight portions) of the U-shaped rigid bars are arranged. Once the rigid bars have been inserted into the stator slots, the legs on the outlet side are bent and then the free ends of the legs are connected to each other by means of welding to form the electrical paths of the stator winding.

To adequately cool a stator with a rigid bar winding, it is known to create a series of axial cooling channels, through which a cooling fluid (typically mineral oil) is circulated. It has been proposed both to create the axial cooling channels through the magnetic core and to create the axial cooling channels through the slots where the conductor bars are arranged. In particular, the solution that involves creating axial cooling channels through the slots where the conductor bars are arranged allows to obtain a high cooling efficiency (since most of the heat is generated inside the conductor bars), but, on the other hand, it hinders the fill factor of the slots (since a relevant part of the slot volume must be allocated to the cooling channels) and has a very complex winding design.

Patent Application DE102018006274A1 discloses an electric machine comprising: a pack of metal sheets, at least one conductor element which is arranged in at least one slot of the pack of steel plates and has a cross-section with at least one rounded corner, and at least one cooling channel which is directly delimited by the rounded corner of the conductor element.

Patent Application US2020169136A1 discloses a winding system wherein at least one pair of adjacent coils are spaced from each other so as to provide at least one channel for the passage of a cooling fluid.

DISCLOSURE OF THE INVENTION

The object of the present invention is to provide a stator with bar winding and fluid cooling for a rotary electric machine, which stator winding allows to obtain a high cooling efficiency while not excessively hindering the slot fill factor, and that is also easy and quick to manufacture.

According to the present invention, a stator with bar winding and fluid cooling is provided for a rotary electric machine as claimed by the appended claims.

The claims describe preferred embodiments of the present invention forming an integral part of the present description.

BRIEF DESCRIPTION OF THE DRAWINGS

The present invention will now be described with reference to the attached drawings, which show a non-limiting embodiment thereof, wherein.

PREFERRED EMBODIMENTS OF THE INVENTION

Figure 1:
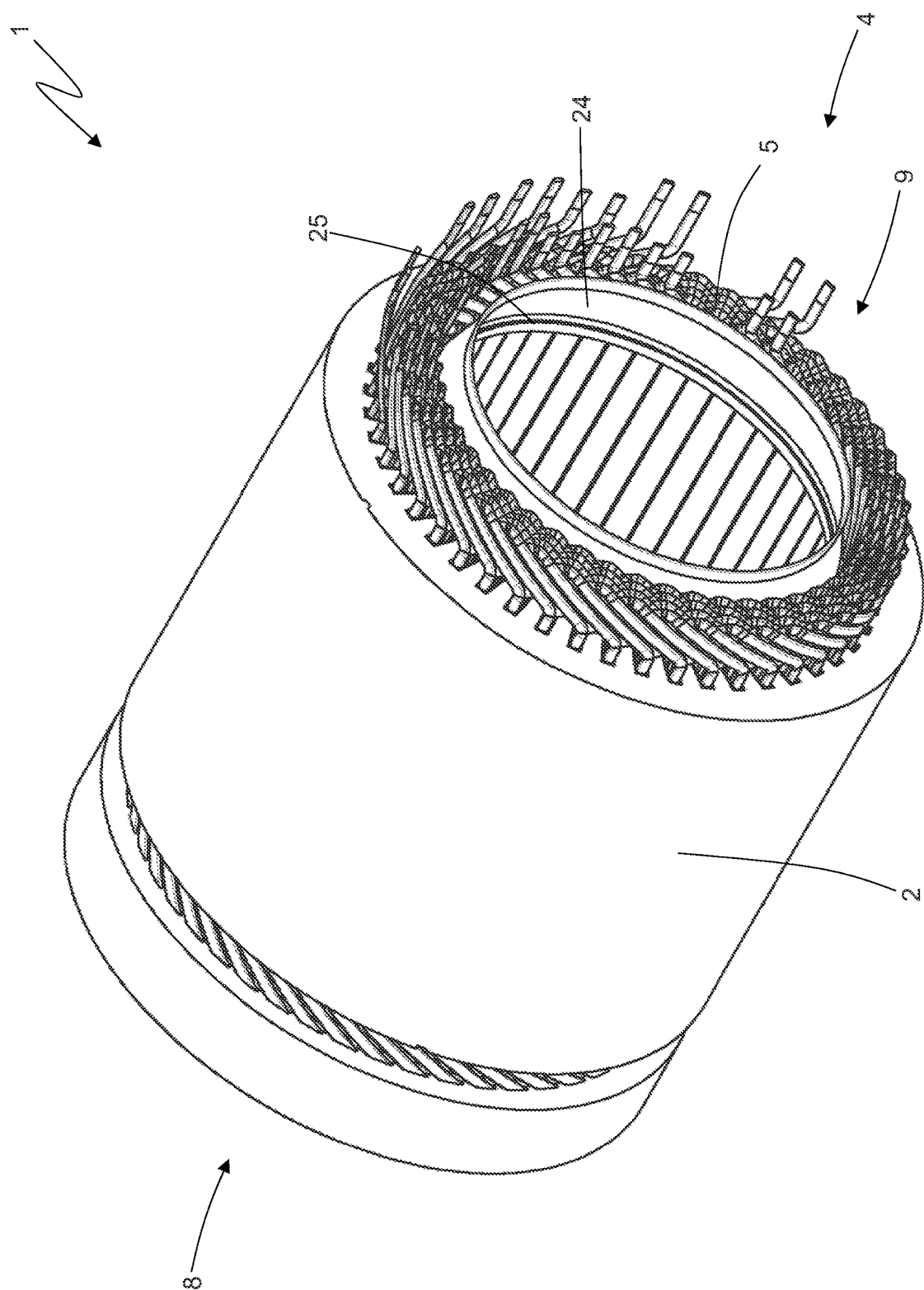
FIG. 1 is a perspective view with parts removed for the sake of clarity of a stator with bar winding and fluid cooling for a rotary electric machine.

In FIG. 1, a stator of a synchronous and rotary electric machine of the reversible type (i.e. which can operate both as an electric motor absorbing electric power and generating a drive torque, and as an electric generator absorbing mechanical power and generating electric power) is overall indicated by 1. The stator 1 has a cylindrical tubular shape and is arranged around a permanent magnet rotor to enclose the rotor itself therein.

Figure 2:
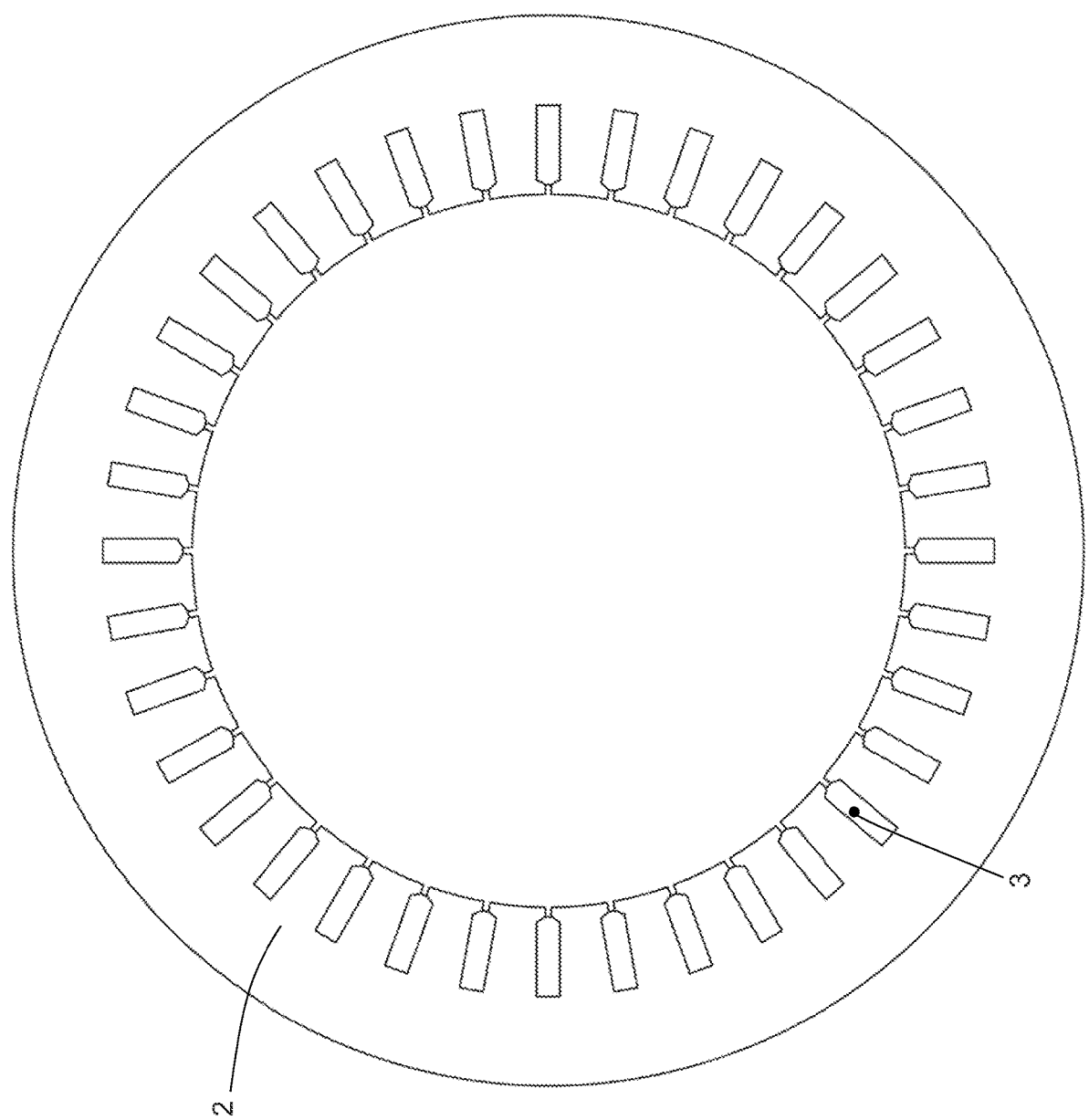
FIG. 2 is a plan view of only the magnetic core of the stator of FIG. 1.

The stator 1 comprises a magnetic core 2 (better shown in FIG. 2) which is made up of a series of steel plates tightened in a pack and has a centrally drilled tubular shape. The magnetic core 2 is longitudinally (axially) crossed by thirty-six slots 3 (better shown in FIG. 2) which are evenly distributed along the inner side of the magnetic core 2 and accommodate a three-phase stator winding 4; according to other embodiments not shown, the number of slots 3 could be different (e.g. there could be forty-eight or seventy-two slots 3).

Figure 3:
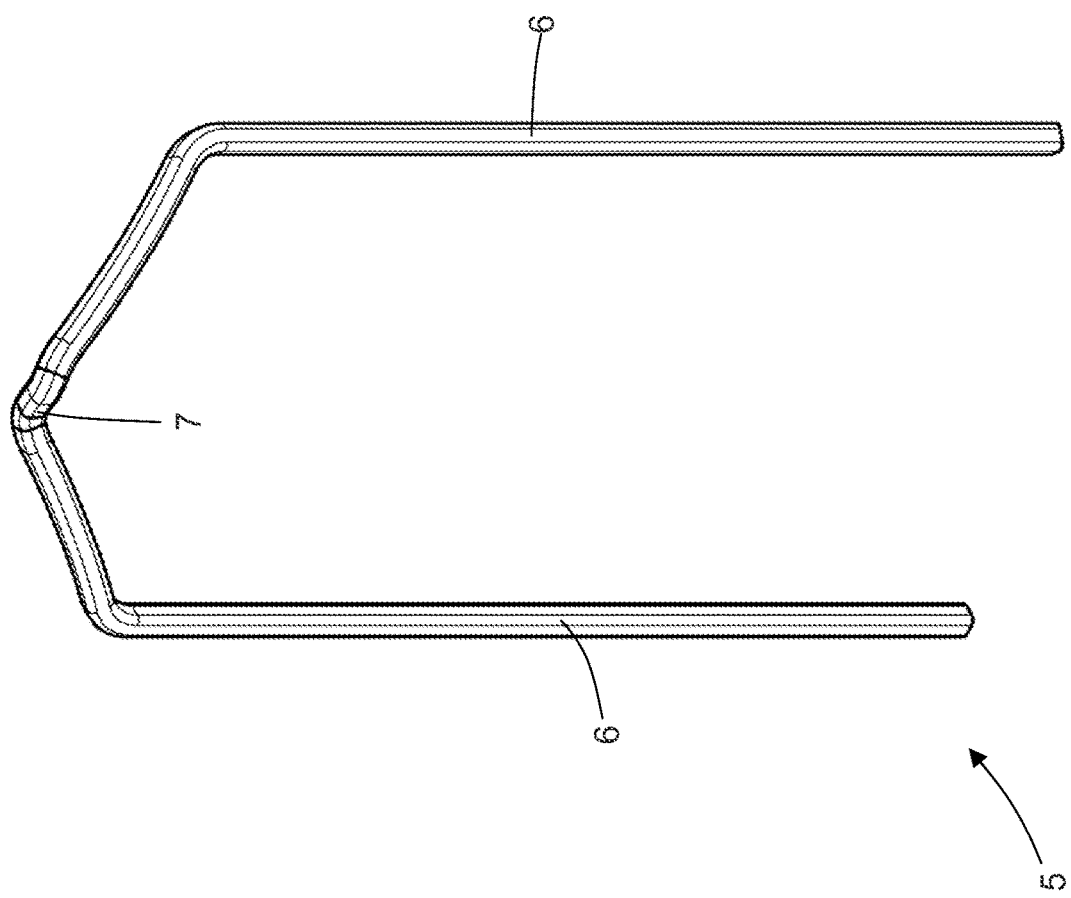
FIG. 3 is a perspective view of a U-shaped bar of the stator bar winding of FIG. 1.
Figure 6:
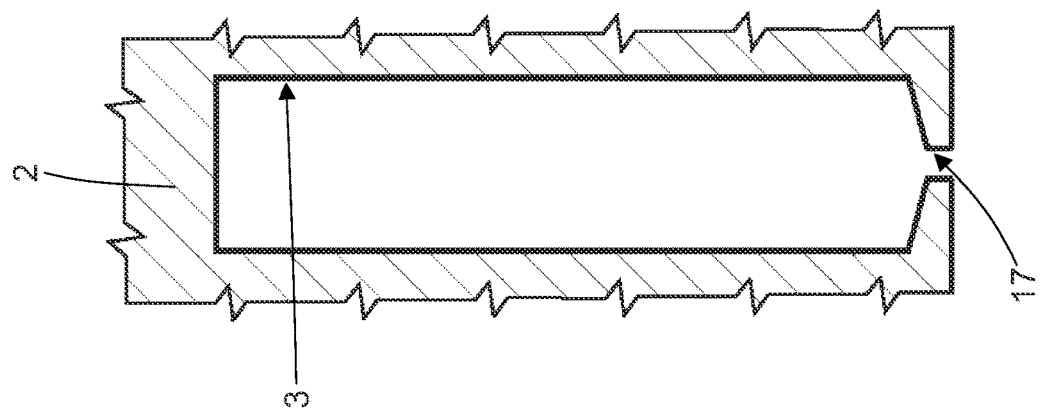
FIGS. 4, 5 and 6 are three cross-sectional views, respectively, of a stator slot of FIG. 1 containing a covering body and conductor bars, of the covering body alone, and of the empty slot.
Figure 5:
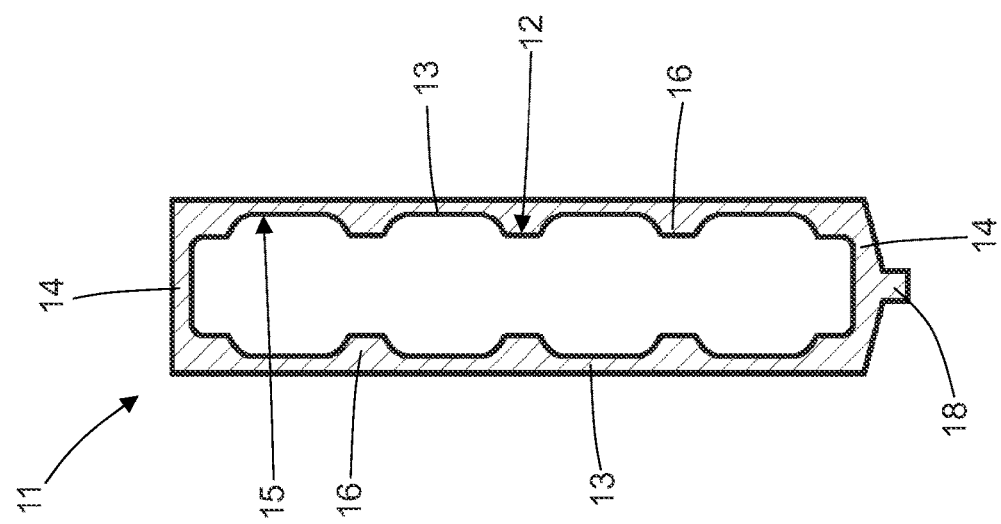

As shown in FIG. 1, the three-phase stator winding 4 comprises a series of rigid U-shaped bars 5, each comprising two legs 6 connected by a cusp 7 (as further shown in FIG. 3); the two legs 6 of a same bar 5 constitute two corresponding active conductors of the stator winding 4.

As shown in FIG. 1, the U-shaped bars 5 are inserted through the slots 3 defining an inlet side 8, where the cusps 7 of the U-shaped bars 5 are arranged, and an outlet side 9, where the end portions of the legs 6 of the U-shaped bars 5 are arranged. The two heads of the stator winding 4 are arranged at the two sides 8 and 9 of the stator winding 4: one head consists of the cusps 7 of the bars 5 (at the inlet side 8) while the other head consists of the end portions of the legs 6 of the bars 5 (at the inlet side 9).

Figure 4:
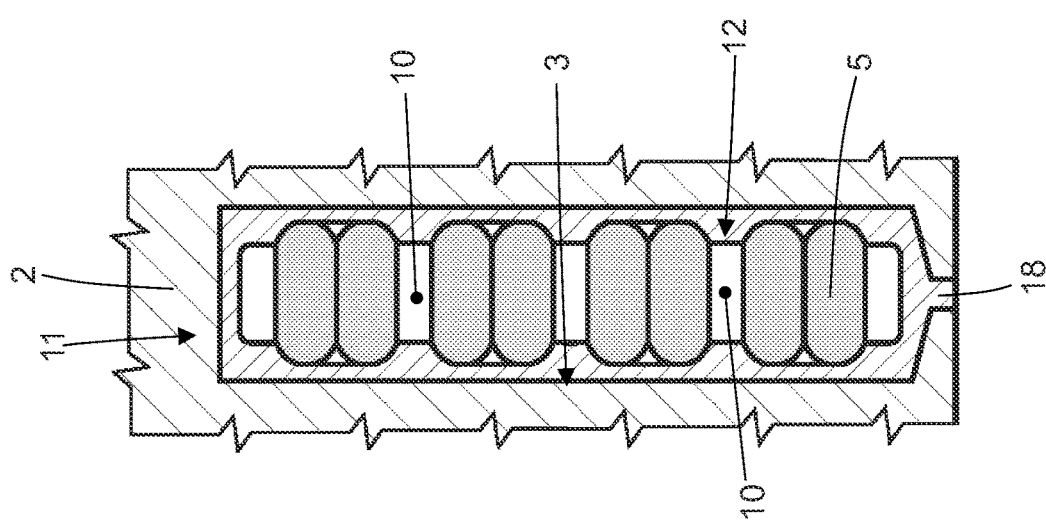

In the embodiment shown in the attached Figures, eight legs 6 (i.e. eight conductors of the stator winding 4) belonging to eight corresponding U-shaped rigid bars 5 are arranged in each slot 3 (as better shown in FIG. 4). The ends of the legs 6 of the U-shaped bars 5 are electrically connected (welded) to each other to form the electrical paths of the stator winding 4.

As shown in FIG. 4, there is provided a plurality of cooling channels 10 which can, in use, be flown through by a cooling fluid (generally mineral oil), and which are obtained within the slots 3 between the bars 5 of the stator winding 4. In particular, a plurality of covering elements 11 is provided, each of which is made of an electrically insulating plastic material, which engages, without clearance, a corresponding slot 3 on all sides of the slot 3, and centrally has a cavity 12 wherein a series of corresponding bars 5 are arranged and wherein the cooling channels 10 are obtained.

According to a preferred embodiment, the plastic material constituting the covering elements 11 is electrically insulating and, as far as possible, thermally conductive so as to also promote the cooling of the magnetic core 2 (wherein some heat generation due to eddy currents and magnetic hysteresis occurs); for example, the plastic material constituting the covering elements 11 preferably has a thermal conductivity greater than 1 W/m K.

Each covering element 11, being electrically insulating, replaces the insulating paper which is normally placed inside the slots 10 to separate the bars 5 from the metal of the magnetic core 2; consequently, the covering elements 11 do not constitute an additional component with respect to a standard stator as they replace the insulating paper which is normally placed inside the slots 10.

Each covering element 11 has two major side walls 13 that are opposed and are radially oriented and two minor head walls 14 that are opposed and are circumferentially oriented, connect the two major side walls 13 to each other and have an extension that is lower than an extension of the major side walls 13.

Each cooling channel 10 is delimited by walls 13 and/or 14 of a corresponding covering element 11 and by at least one corresponding bar 5; in particular, in each slot 3 two end cooling channels 10 are provided which are arranged at the sides of the bars 5 (thus delimited radially on one side by a bar 5 and on the opposite side by a smaller end wall 14 of the covering element 11) and central cooling channels 10 arranged between the bars 5 (thus delimited radially by two bars 5 on both sides).

Each covering element 11 has seats 15 (four seats 15 in particular), each of which is configured to accommodate a pair of corresponding bars 5 arranged in contact with each other. According to a different embodiment not shown, each seat 15 is configured to accommodate a single bar 5 or three or four bars arranged in contact with each other. Accordingly, in each covering element 11, the cooling channels 10 are arranged next to the seats 15 where the bars 5 are arranged and are directly delimited by the bars 5 (i.e. at least one wall of each cooling channel 10 consists of a bar 5).

According to a preferred embodiment shown in the attached figures, each major side wall 13 has axial ribs 16, each of which delimits a corresponding seat 15; that is, each seat 15 is delimited by two radially staggered axial ribs 16.

Each slot 3 has a through opening 17 facing a central axis; the through openings 17 have an important function, as they serve to "magnetically insulate" the teeth of the magnetic core 2 in such a way that they "force" the magnetic flow generated by the bars 5 to affect the rotor instead of only closing in the magnetic core 2 of the stator 1. According to a preferred embodiment shown in the accompanying figures, each covering element 11 has a protuberance 18 which engages the through opening 17 of the corresponding slot 3 without clearance; that is, each protuberance 18 completely fills the through opening 17 of the corresponding slot 3.

The stator 1 comprises two annular cooling manifolds 19 and 20 (shown in FIGS. 8 and 9) which are arranged at opposite ends of the magnetic core 2 and into which the cooling channels 10 flow. The cooling manifold 19 forms the cooling fluid supply to the cooling channels 10 and is connected with a cooling fluid inlet 21 in the stator 1 (shown in FIG. 8). The cooling manifold 20 constitutes the return of the cooling fluid from the cooling channels 10 and is connected with a cooling fluid outlet 22 in the stator 1 (shown in FIG. 9). As mentioned above, the stator winding 4 has two heads and the two heads are accommodated in the cooling manifolds 19 and 20 in such a way that they are cooled by the cooling fluid circulating in the cooling manifolds 19 and 20.

Figure 8:
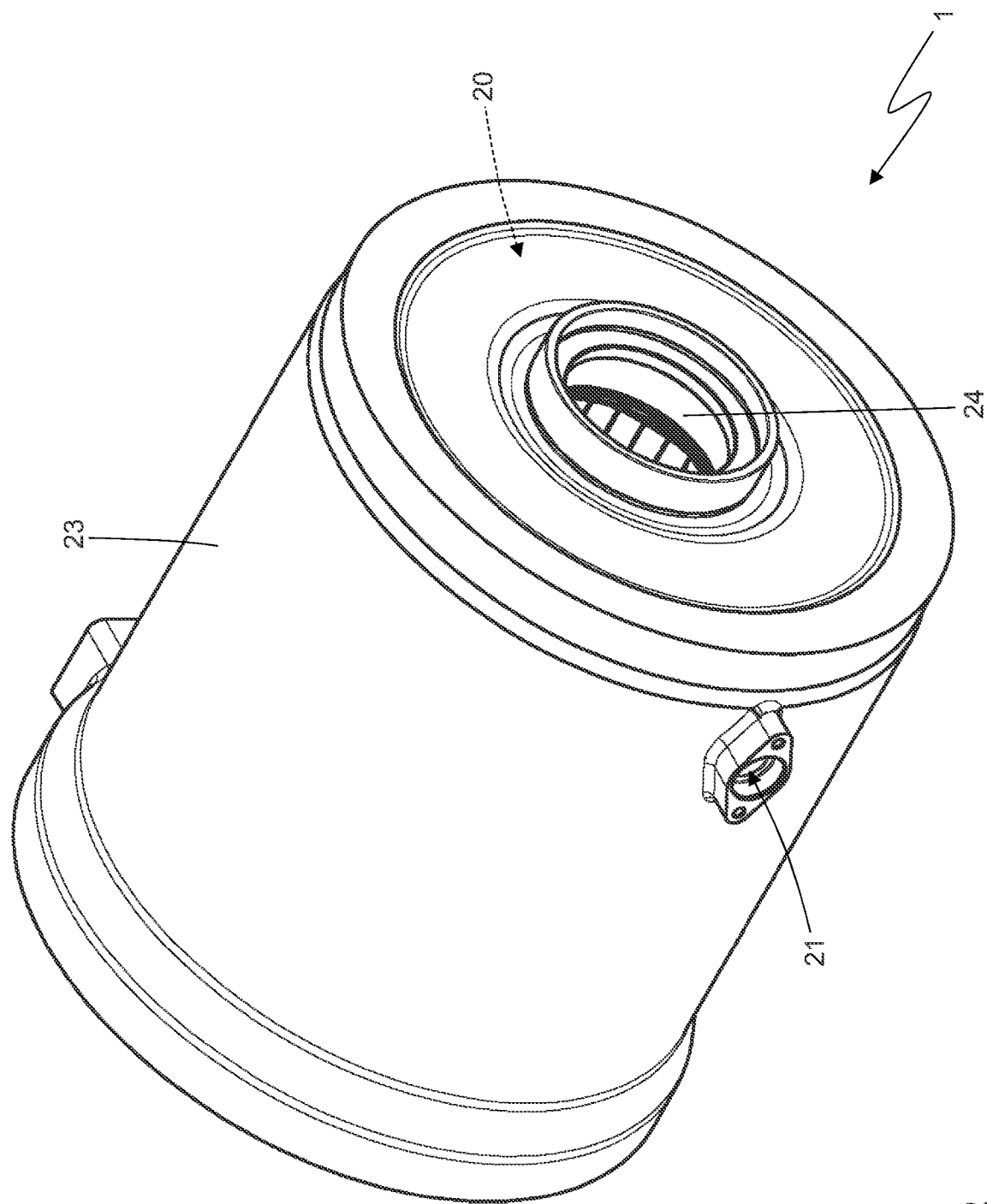
FIGS. 8 and 9 are two different perspective views with parts removed for the sake of clarity of a casing containing the stator of FIG. 1.
Figure 9:
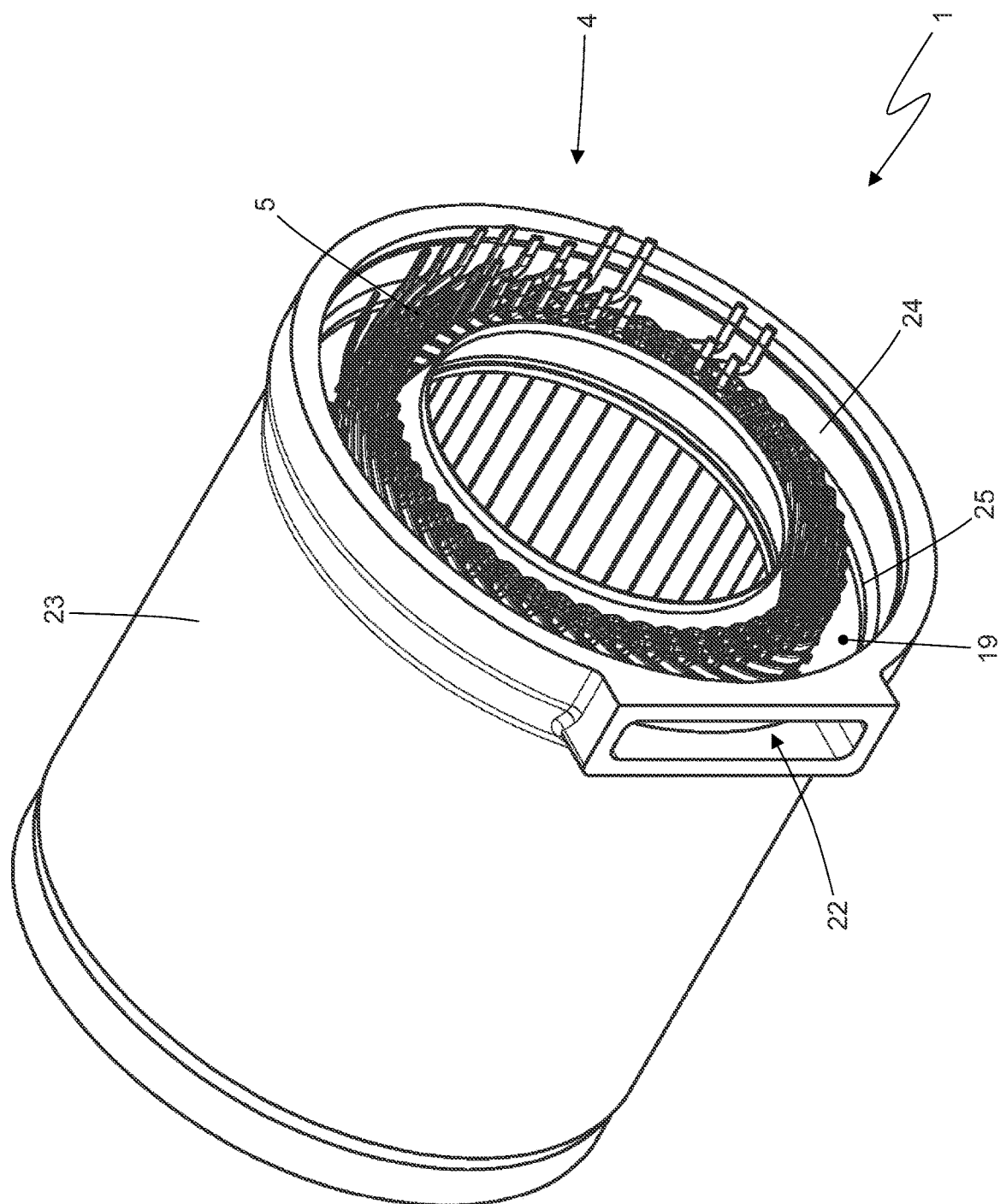

As shown in FIGS. 8 and 9, the stator 1 comprises a casing 23 which contains the magnetic core 2 and externally delimits the two cooling manifolds 19 and 20. In addition, the stator 1 comprises two annular containing bodies 24, each of which internally delimits a corresponding cooling manifold and is made of plastic.

Figure 7:
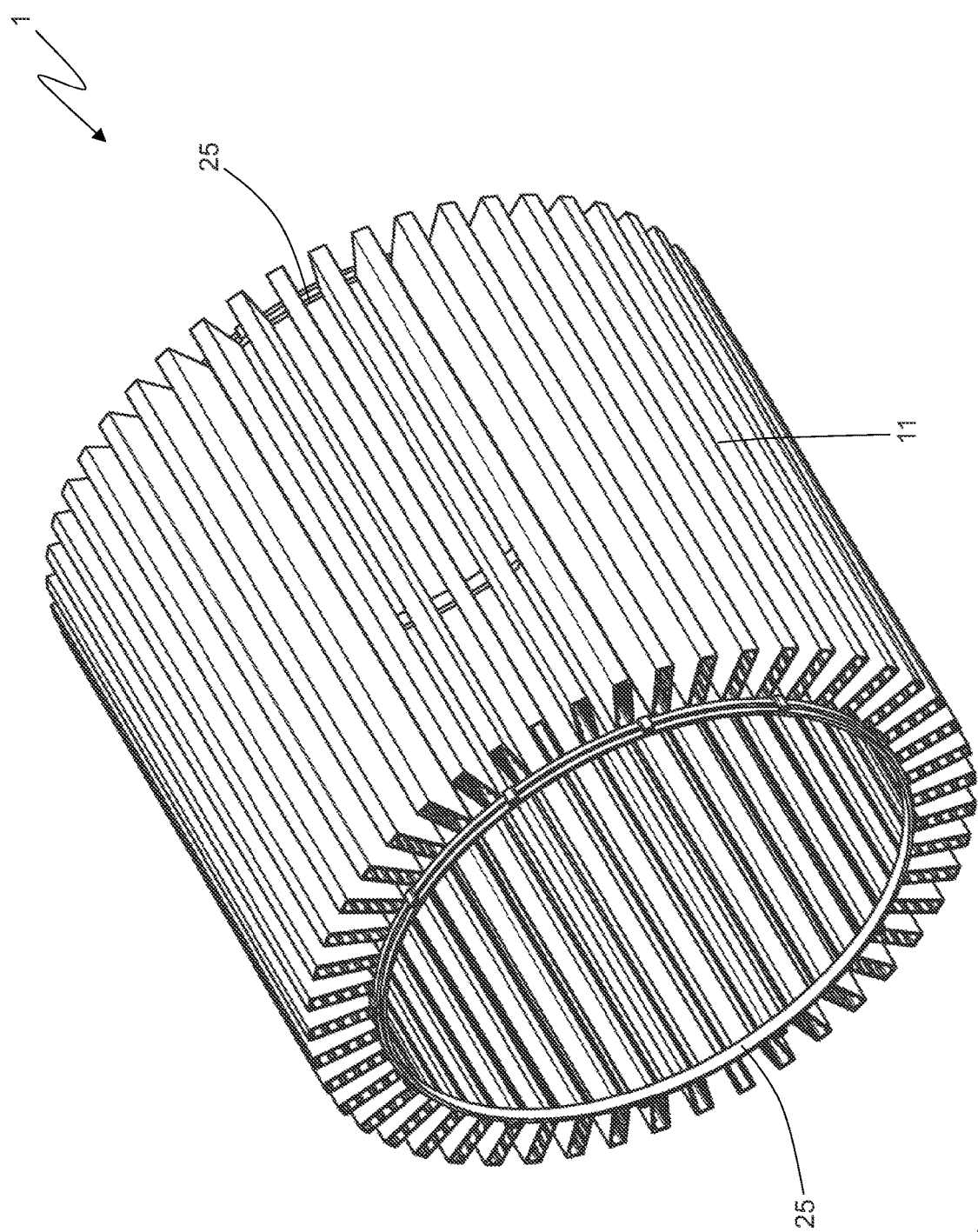
FIG. 7 is a perspective view of all the covering bodies of the stator of FIG. 1.

According to a preferred embodiment shown in the attached figures (and better visible in FIGS. 1 and 7), the stator 1 comprising two annular connection bodies 25, which are arranged at the two opposite ends of the magnetic core 2, are connected without interruptions to the covering elements 11 with which they form a single, indivisible assembly, and form a base for the containing bodies 24. In particular, the containing bodies 24 can be welded to the annular connection bodies 25 to create a tight fit that prevents leakage of the cooling fluid. In other words, each connection body 25 connects together (on a respective side of the magnetic core 2) all the covering elements 11 that are present in the slots 3.

According to a preferred embodiment, manufacturing the stator 1 involves injection moulding the plastic material into the grooves 3 of the magnetic core 2 in order to make both the covering elements 11 and the two connection bodies 25 (the two connection bodies 25 are thereby connected without interruptions to the covering elements 11 with which they form a single and indivisible assembly). In other words, the covering elements 11 (together with the two connection bodies 25) are co-injected into the magnetic core 2 before the bars 5 are inserted into the slots 3 of the magnetic core 2. Once the covering elements 11 have been manufactured by injection moulding, the bars 5 are inserted into the covering elements 11 which internally cover the slots 3.

The herein described embodiments can combine one another without departing from the scope of protection of the present invention.

The above-described stator 1 has many advantages.

Firstly, the above-described stator 1 allows to obtain high cooling efficiency due to the fact that the cooling channels 10 are directly delimited by the bars 5 and thus remove heat directly from where it is generated.

Furthermore, the above-described stator 1 has a good filling coefficient of the slots 3, as some of the walls of the cooling channels 10 consist of the bars 5 and are therefore made without adding additional components that would take space inside the slots 5, reducing the filling coefficient of the slots 3.

In addition, the above-described stator 1 is easy and quick to manufacture, as all the covering elements 11 can be made together quickly by being co-injected in the magnetic core 2.

Finally, the above-described stator 1 is cost-effective to produce, as the co-injection moulding of the covering elements 11 can be carried out using widely available, low-cost manufacturing techniques.

LIST OF REFERENCE NUMBERS OF THE FIGURES 1 stator
2 magnetic core
3 slots
4 stator winding
5 bars
6 legs
7 cusp
8 inlet side
9 outlet side
10 cooling channels
11 covering elements
12 cavity
13 major side walls
14 minor head walls
15 seats
16 ribs
17 through-opening
18 protuberance
19 cooling manifold
20 cooling manifold
21 inlet
22 outlet
23 casing
24 containing bodies
25 connection bodies

The invention claimed is:

1. A stator for a rotary electric machine and comprising:
a magnetic core axially crossed by a plurality of slots;
a stator winding comprising a plurality of bars, which are arranged inside the slots;
a plurality of cooling channels, which, in use, can be flown through by a cooling fluid and are obtained inside the slots between the bars of the stator winding; and
a plurality of covering elements, each of which is made of an electrically insulating plastic material, engages a corresponding slot, without clearance, on all sides of the slot and has, at the centre, a cavity where a series of corresponding bars are arranged and the cooling channels are obtained;
wherein each covering element has two major side walls that are opposed and radially oriented and two opposite minor head walls connect the two major side walls to each other and have an extension lower than an extension of the major side walls;
wherein each cooling channel is delimited by walls of a corresponding covering element and by at least one corresponding bar;
wherein each covering element has seats, each of which consists of two facing and opposite recesses cut into the two major side walls of the covering element and is configured to accommodate therein, without clearance, the ends of at least one corresponding bar;
wherein the cooling channels are arranged next to the seats where the bars are arranged;
wherein two annular cooling manifolds are provided which are arranged at opposite ends of the magnetic core and into which the cooling channels flow;
wherein two annular containing bodies are provided, each of which internally delimits a corresponding cooling manifold and is made of plastic material; and
wherein two annular connection bodies are provided, which are arranged at the two opposite ends of the magnetic core, are connected without interruptions to all the covering elements with which they form a single, indivisible assembly, and thus connect all the covering elements together, and form a support base for the containing bodies.

2. The stator according to claim 1, wherein each seat is shaped so as to accommodate at least two bars in contact with one another.

3. The stator according to claim 1, wherein each seat is shaped so as to accommodate exactly two bars in contact with one another.

4. The stator according to claim 1, wherein in each slot two end cooling channels are provided that are arranged on the sides of the bars and of the central cooling channels arranged between the bars.

5. The stator according to claim 1, wherein:
each slot has a through opening facing a central axis; and
each covering element has a protuberance engaging, without clearance, the through opening of the corresponding slot.

6. The stator according to claim 1, wherein each major side wall has axial ribs, each of which delimits a corresponding seat.

7. The stator according to claim 1 and comprising a casing which contains the magnetic core and externally delimits the two cooling manifolds.

8. The stator according to claim 7, wherein the stator winding has two heads which are housed in the cooling manifolds.

9. The stator according to claim 1, wherein each connection body connects all the covering elements in the slots together.

10. The stator according to claim 1, wherein the containing bodies are welded to the respective annular connecting bodies.

11. The stator according to claim 1, wherein the covering elements are made of a plastic material having a thermal conductivity greater than 1 W/m K.

12. A method for manufacturing the stator according to claim 1 and comprising the steps of:
injection moulding the plastic material into the slots of the magnetic core to manufacture the covering elements; and
inserting the bars into the covering elements internally lining the slots.

* * * * *